United States Patent
Chae et al.

(10) Patent No.: US 8,387,893 B2
(45) Date of Patent: Mar. 5, 2013

(54) STRUCTURE AND METHOD FOR CONSTRUCTING 2-PLY UPPER BOARD OF DRY HEATING SYSTEM

(75) Inventors: Kyoung-Myoung Chae, Daejeon (KR); Sung-Seock Hwang, Cheongju-si (KR); Se-Chang Kang, Cheongju-si (KR); Dong-Sik Jang, Busan (KR); Seung-Chul Hwang, Busan (KR); Suk Jang, Suwon-si (KR)

(73) Assignee: LG Chem, Ltd. (KR)

( * ) Notice: Subject to any disclaimer, the term of this patent is extended or adjusted under 35 U.S.C. 154(b) by 1535 days.

(21) Appl. No.: 11/300,895

(22) Filed: Dec. 15, 2005

(65) Prior Publication Data

US 2006/0289437 A1    Dec. 28, 2006

(30) Foreign Application Priority Data

May 18, 2005   (KR) .................. 10-2005-0041394

(51) Int. Cl.
*F24D 5/10*   (2006.01)

(52) U.S. Cl. ............... 237/69; 237/2 A; 237/56; 237/57; 237/58; 237/71; 219/213; 219/528; 219/400; 165/49; 165/178; 165/170; 165/53; 52/288.1; 52/782.1; 52/610; 52/287.1; 52/211

(58) Field of Classification Search ............ 237/69, 237/2 A, 56, 57, 58, 71; 165/49, 178, 170, 165/53; 52/288.1, 782.1, 610, 287.1, 211; 219/213, 528, 400

See application file for complete search history.

(56) References Cited

U.S. PATENT DOCUMENTS

| | | | | | |
|---|---|---|---|---|---|
| 2,991,516 | A | * | 7/1961 | Boettcher | 52/288.1 |
| 3,377,755 | A | * | 4/1968 | Rudolf et al. | 52/79.13 |
| 4,365,782 | A | * | 12/1982 | Persson | 249/91 |
| 4,682,459 | A | * | 7/1987 | Stephenson | 52/390 |
| 4,865,120 | A | | 9/1989 | Shiroki | 165/56 |
| 5,454,428 | A | * | 10/1995 | Pickard et al. | 165/49 |
| 5,957,378 | A | * | 9/1999 | Fiedrich | 237/69 |
| 7,225,591 | B2 | * | 6/2007 | Lin et al. | 52/403.1 |

* cited by examiner

*Primary Examiner* — Steven B McAllister
*Assistant Examiner* — Avinash Savani
(74) *Attorney, Agent, or Firm* — Cantor Colburn LLP

(57) ABSTRACT

A structure of a dry heating system, and a method for constructing the same are disclosed. An upper board stacked on a heat radiator has a double-layer structure comprising first upper board elements and second upper board elements in order to prevent steps from being formed at seaming portions formed on the upper portion of the dry heating system, thereby maintaining flatness of the upper board, and reducing any bending of the upper board, in which the first upper board elements constitute a lower portion of the double-layer structure, and serve to protect the heat radiator while supporting a weight load, and the second upper board elements constitute an upper portion of the double-layer structure, and serve to maintain the flatness of the upper board by removing the steps, thereby ensuring excellent quality in construction of the dry heating system.

10 Claims, 4 Drawing Sheets

STRUCTURE AND METHOD FOR CONSTRUCTING 2-PLY UPPER BOARD OF DRY HEATING SYSTEM

This application claims the benefit of the filing date of Korean Patent Application No. 10-2005-0041394 filed on May 18, 2005 in the Korean Intellectual Property Office, the disclosure of which is incorporated herein in their entirety by reference.

TECHNICAL FIELD

The present invention relates to a dry heating system, which comprises a heat radiator such as a heating panel or a hot water pipe employing hot water as a heat source. More particularly, the present invention relates to a structure of a dry heating system, and a method for constructing the same, which can ensure excellent quality in construction of the heating system by constructing an upper board stacked on a heat radiator to a double-layer structure so as to prevent a step from being formed at a seaming portion on the heating system, thereby maintaining the flatness of the upper board while reducing any bending of the upper board caused by heat.

BACKGROUND ART

Generally, a heating system, having been applied to residential buildings, such as houses, villas, and apartments, employs a structure involving a wet heating process, in which a pipe, laid under a flooring material of a room in a building, is supplied with heating fluid, such as hot water, thereby heating the room of the building.

However, such a wet heating system does not have an excellent heat insulation efficiency, which causes a low heating efficiency. In addition, the wet heating system cannot effectively shield noise or vibration, thereby causing little noise proofing. Furthermore, the wet heating system is difficult to be overhauled, thereby increasing associated overhaul costs.

In order to solve the problems of the conventional wet heating system as described above, a dry heating panel was developed, which is made of concrete, a synthetic resin or yellow clay. The dry heating panel comprises a pipe embedded therein for carrying hot water therethrough, or is provided with grooves or fixing members for inserting the pipe therein. The dry heating panel is an assembly type heating panel, and has advantageous effects in that the heating system is constructed by simply assembling prefabricated pieces of the dry heating panel, thereby reducing construction time, and simplifying maintenance and overhaul operations thereof.

However, such an assembly type heating system has problems in that, since it is not compatible with a finishing material such as a monoleum floor, an Ondol floor, a PVC tile floor, and the like, the construction quality of the finishing material is lowered, thereby reducing the quality of product.

In addition, since the conventional assembly type heating system has problems in that, since a heat radiating upper board of the heating system is constituted by a single layer of a steel board or an inorganic board, it is difficult to remove a step formed at a seaming portion, which causes deterioration in flatness of the upper board, and inconvenience in treatment of the seaming portion during construction of the heating system. Furthermore, the upper board is likely to be bent due to heat, so that the step formed at the seaming portion on the upper board is increased in its height, and the flatness of the upper board is further deteriorated.

DISCLOSURE

Technical Problem

Therefore, the present invention has been made in view of the above and other problems, and it is an object of the present invention to provide a structure of a dry heating system, and a method for constructing the dry heating system, which can ensure excellent quality in construction of the heating system by removing a step from being formed at a seaming portion on the heating system, thereby maintaining the flatness of an upper board while reducing any bending of the upper board caused by heat.

Technical Solution

In accordance with one aspect of the present invention, the above and other objects can be accomplished by providing a structure of a dry heating system which comprises a heat radiator and an upper board stacked on the heat radiator, wherein the upper board comprises a plurality of first upper board elements and a plurality of second upper board elements to constitute a double-layer structure, and the first upper board elements and the second upper board elements are stacked on the heat radiator so as to cross each other at upper and lower portions of the upper board.

The present invention is conceived to ensure excellent quality in construction of the dry heating system, and is characterized in that the upper board stacked on the heat radiator has the double-layer structure in order to prevent steps from being formed at seaming portions between the first or second upper board elements in the dry heating system, thereby maintaining the flatness of the upper board, and reducing any bending of the upper board. The first upper board elements constitute a lower portion of the double-layer structure, and serve to protect the heat radiator (such as a hot water pipe or a heating panel employing hot water) below the upper board while supporting a weight (of commodities) loaded on the upper board. The second upper board elements constitute an upper portion of the double-layer structure, and serve to maintain the flatness of the upper board by removing the steps which can be formed at the seaming portions on the dry heating system.

In view of strength and flatness of the upper board, it is preferable that the seaming portions between the first upper board elements and the seaming portions between the second upper board elements are alternately arranged at upper and lower portions of the upper board so as not to overlap each other.

The total thickness of the first and second upper board elements is 9 mm or more, and preferably 9~12 mm, wherein the first upper board element has a thickness of 6 mm, preferably of 6~8 mm, and the second upper board element preferably has a thickness of 3~6 mm.

Although a higher thickness of upper board provides better quality in the construction, the upper limit in thickness of the upper board is provided in consideration of a living space. More specifically, if the upper board has a thickness of 12 mm, and the heat radiator has a thickness of 32 mm, the thickness of the overall heating system is 44 mm. Accordingly, it is possible to secure a more living space of about 70 mm than the conventional wet heating system having the total thickness of 110~120 mm. In particular, in the case of high buildings, since this construction reduces a floor height (a height from a slab of a floor to another slab of the next floor), it is more efficient.

In comparison to the case where the upper board is constituted of a single layer, when the upper board is constituted by overlapping two layers, the strength of the upper board against a local load is lowered. Thus, it is necessary that the total thickness of the first and second upper board elements be 9 mm or more in order to endure a force of 30 kgf/cm² or more which is required when applying a predetermined local compressive strength thereto (Test Method: KS F 2273), and in order to have a compressed depth of 3 mm or less for a load of 100 kgf.

Since the first upper board elements protect the heating material below the upper board, and support the load on the upper board, each of the first upper board elements must have a bending strength of 100 kgf/cm² or more. Meanwhile, since the second upper board elements serve to remove steep steps at the seaming portions between the first upper board elements in order to form a smooth curve on the upper board, each of the second upper board elements must be flexible. In this regard, if the second upper board element has a thickness more than 6 mm, the second upper board element has a low flexibility, and thus the second upper board element preferably has a thickness in the range of 3~6 mm.

In accordance with a preferred embodiment of the present invention, the structure of the dry heating system further comprise a heat insulation material formed on a slab constituting a bottom of a building, and a side molding material provided to a side of the heat insulation material, and fixed to the slab, wherein the heat radiator is positioned on the heat insulation material, and employs hot water as a heat source, wherein the first upper board elements are stacked on the heat radiator, and fixed to the side molding material, and wherein the second upper board elements are stacked on the first upper board elements, and bonded to the first upper board elements by adhesives.

Preferably, the first upper board elements are bonded to the second upper board elements by heat resistance epoxy-based adhesives. In addition, the adhesives are applied in an amount of 2~10 kg/pyung (3.3 m²), and preferably, in an amount of 2.5~5 kg/pyung (3.3 m²). Preferably, the adhesives comprise a base resin, and a curing agent mixed in the ratio of 0.3~1.5 in terms of weight ratio.

The first and second upper board elements are made of at least one of inorganic boards, metal plates, Engineering Plastics (EP), Wood Polymer Composites (WPC). Preferably, the upper boards are made of inorganic boards.

Although it is advantageous that the side molding material has a square shape in order to prevent confusion of the orientation of the side molding material, it is desirable that the side molding material have a chamfer portion (chamfer surface) formed at one corner in consideration of related issues during construction of the heating system. If the slab does not constitute a right angle with respect to a wall (this phenomenon can occur when the slab is rounded at one side thereof due to surface tension of the slab generated during construction of the slab), the square-shape side molding material cannot be brought into tight contact with the slab. Thus, the chamfer portion of the side molding material allows the square-shape side molding material to be brought into tight contact with the slab by placing non-right angled portion between the slab and the wall. In view of bending strength, both length and width of the side molding material are preferably in the range of 30~50 mm.

The first upper board elements are fixed to the side molding material by means of self drill screws, and in order to securely fix the first upper board elements using the self drill screws, a fixed depth of each self drill screw in the square-shape side molding material is preferably in the range of 20~50 mm.

The heat radiator is any kind of a hot water pipe, a heating panel comprising the hot water pipe, a heating panel having an internal fluid passageway formed therein, etc.

In accordance with another aspect of the present invention, a method for constructing a dry heating system is provided, comprising the steps of: providing a heat insulation material on a slab constituting a bottom of a building; providing a side molding material to a side of the heat insulation material, followed by fixing the side molding material to the slab; providing a heat radiator on the heat insulation material, the heat radiator employing hot water as a heat source; providing first upper board elements on the heat radiator, followed by fixing the first upper board elements to the side molding material; and applying adhesives to an upper surface of the first upper board elements, followed by bonding second upper board elements to the first upper board elements.

When applying the adhesives, a hera made of a steel plate and having a groove formed thereon is used, the groove having a width and a height of 3~7 mm, a pitch length of 9~22 mm, and a pitch distance of 6~15 mm.

DESCRIPTION OF THE DRAWINGS

The above and other objects, features and other advantages of the present invention will be more clearly understood from the following detailed description taken in conjunction with the accompanying drawings, in which.

BEST MODE

Preferred embodiments of the present invention will be described in detail with reference to the drawings.

Figure 1:
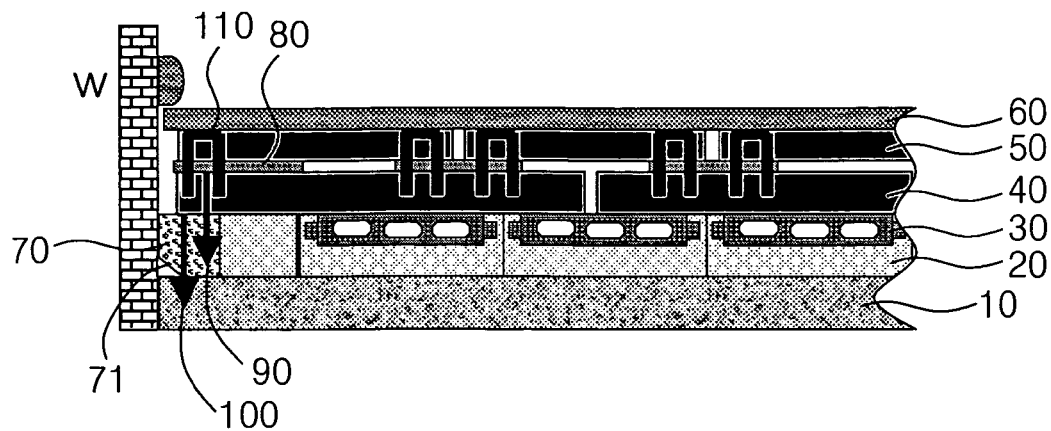
FIG. 1 is a cross-sectional view illustrating the structure of a dry heating system in accordance with the present invention.

FIG. 1 is a cross-sectional view illustrating a structure of a dry heating system in accordance with the present invention. The dry heating system of the present invention comprises a heat insulation material 20 formed on a slab 10 constituting the bottom of a building, a side molding material 70 provided to a side of the heat insulation material 20, and fixed to the slab 10 by concrete tacker pins 100, a heat radiator 30 positioned on the heat insulation material 20 and employing hot water as a heat source, first upper board elements 40 stacked on the heat radiator 30 and fixed to the side molding material 70 by self drill screws 90, and second upper board elements 50 stacked on the first upper board elements 40 and boded thereto by adhesives 80.

The heat insulation material 20 is provided for the purpose of enhancing heating efficiency by preventing heat emitted from the heat radiator 30 from being transferred through the bottom of the slab 10, and is typically made of Expandable Polystyrene (EXP).

The heat radiator 30 is a heat generating body, and acts as a substantial heating component of the dry heating system. The heat radiator 30 is characterized in that it employs hot water as a heat source. As for the heat radiator 30, a hot water pipe or any kind of dry heating panel including a heat radiating panel comprising a hot water pipe, a heat radiating panel having an internal fluid passageway formed therein, etc. can be used.

The first upper board elements 40 steadily endure a load applied to the heat radiator 30, and cover the entire surface of the heat radiator 30 in order to protect the heat radiator 30.

The second upper board elements 50 maintain the flatness of the upper board of the heating system by removing steps formed at seaming portions between the first upper board elements 40, thereby enhancing the construction quality of the heating system while allowing easy application of a floor finishing material 60.

As for materials of the first and second upper board elements 40 and 50, inorganic boards, metal plates such as aluminum plated steel plates, Engineering Plastics (EP), Wood Polymer Composites (WPC), and the like can be used in order to enhance heat transfer and load resistance.

Although the aluminum plated steel sheet has an excellent thermal conductivity, there is a possibility of bending of the first or second upper board elements if the floor finishing material 60 is made of wood. That is, when heat is applied to the upper board and the wood finishing material, moisture is evaporated from the wood finishing material, causing shrinkage of the finishing material, whereas the steel plate is expanded, thereby causing bending of the steel plate (similar to bimetal phenomenon). Accordingly, although the inorganic boards have a lower thermal conductivity than the metal plate, they are preferably used as a material for the upper board of the heating system due to its excellent heat accumulation capacity.

In particular, the first upper board elements 40 are preferably made of a fiber reinforced cement board such as a Cellulose Fiber Reinforced Cement Board (CRC) among various inorganic boards in order to endure the load applied thereto while protecting the heat radiator below the first upper board elements. The second upper board elements 50 are preferably made of a magnesium board in order to maintain the flatness of the upper board by removing the steps formed at the seaming portions.

The first upper board elements 40 are boned to the second upper board elements 50 by the adhesives 80. At this time, it is desirable in terms of strength and flatness of the upper board that the seaming portions between the first upper board elements 40 and between the second upper board elements 50 be alternately arranged at upper and lower portions of the upper board so as not to overlap each other.

As for the adhesives 80, heat resistant epoxy-based adhesives are preferably used in order to prevent the bonding force of the adhesive 80 from being deteriorated due to heat The adhesives are applied in an amount of 2~10 kg/pyung (3.3 m$^2$), and preferably, in an amount of 2.5~5 kg/pyung. The adhesives 80 are composed of a heat resistance epoxy resin as a base resin, and an amine-based or acid anhydride-based curing agent for curing the epoxy resin, and a mixing ratio of the base resin and the curing agent is preferably in the range of 0.3~1.5.

It is desirable that, after bonding the second upper board elements 50 to the first upper board elements 40 with the adhesives 80, the first upper board elements 40 and the second upper board elements 50 are fixed using air tacker pins 110 until the adhesives 80 are cured. The air tacker pins 110 are fixed to the first and second upper board elements 50 and 40 using an air tool, and preferably, as shown in FIG. 1, the C-shaped air tacker pins 110 are fixed from the second upper board elements 50 to the first upper board elements 40.

After fixing the first and second upper board elements 40 and 50 using the air tacker pins, a seaming process (putty work), and construction of floor finishing material 60 are sequentially performed.

The side molding material 70 serves to fix the first upper board elements 40, and is provided between a wall W and the heat insulation material 20. Although the side molding material 70 may have a square shape in order to prevent confusion of orientation of the side molding material, it is desirable that the side molding material 70 have a chamfer portion formed at one side thereof in consideration of environments during construction of the heating system. In view of bending strength, both length and width of the side molding material 70 are preferably in the range of 30~50 mm. The side molding material 70 is fixed to the slab 10 using the concrete tacker pins 100.

The self drill screws 90 are provided as means for fixing the first upper board elements 40 to the side molding material 70. In order to obtain a sufficient fixing force with respect to the first upper board elements 40, each of the self drill screws 90 penetrates an associated first upper board element 40, and is then inserted to the side molding material 70, in which a fixed depth of the self drill screw 90 in the side molding material 70 is preferably in the range of 20~50 mm.

Figure 2:
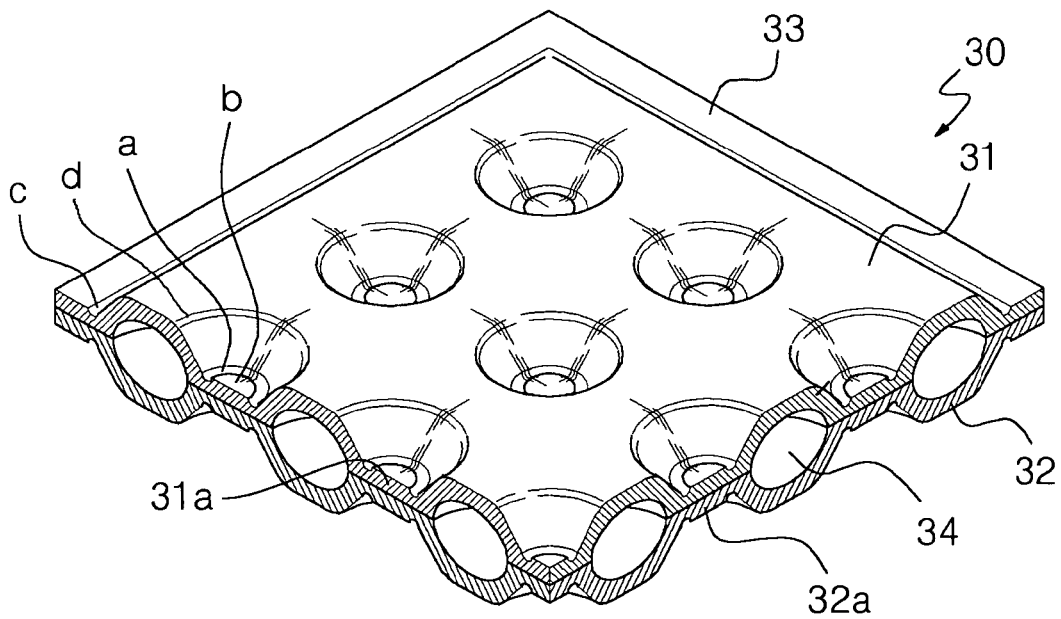
FIG. 2 is a cutaway perspective view of one embodiment of a heating panel used as a heat radiator in the dry heating system of the present invention, in which the heating panel has a circular or elliptical fluid passageway formed therein.

FIG. 2 is a cutaway perspective view of a heating panel as one embodiment of the heat radiator in the dry heating system of the present invention, in which the heating panel has a circular or elliptical fluid pathway formed therein. The heating panel 30 comprises upper and lower plates 31 and 32 integrally formed to face each other, forming inner fluid pathways 34 in which heating fluid flows. The heating panel 30 comprises the upper and lower plates 31 and 32, a plurality of bonding members 31a and 32a symmetrically extending from the upper and lower plates 31 and 32, respectively, and the inner fluid pathways 34. Each inner fluid pathway 34 of the heating panel 30 is formed to a substantially circular shape by forming the bonding members 31a and 32a to round structures "d," and forming the bonding members 31a and 32a, and a panel connecting portion 33 to grooves "a," "b," and "c," respectively.

Figure 3:
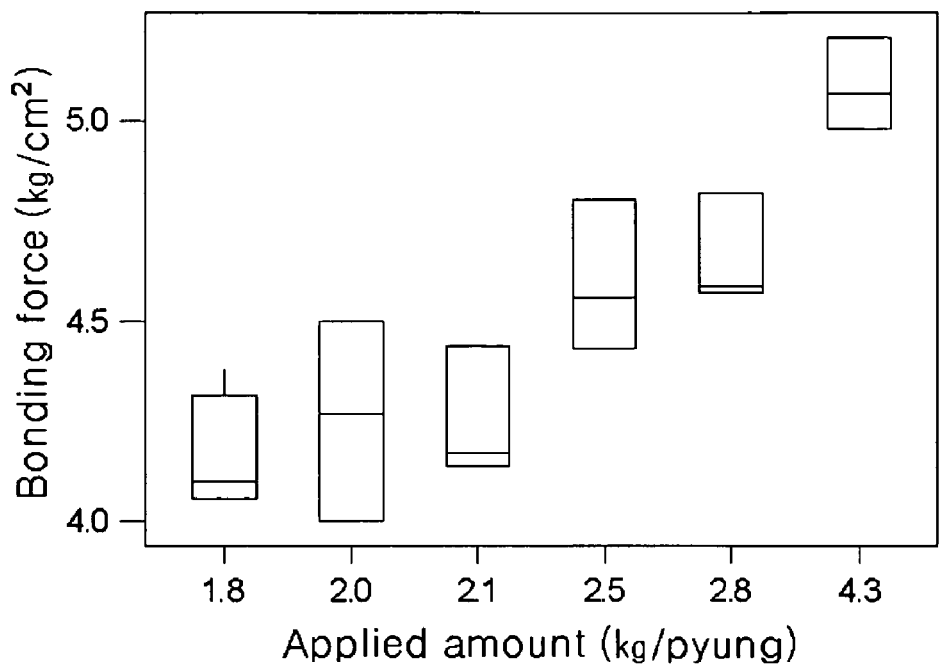
FIG. 3 is a graph for illustrating correlation between a bonding force and an applied amount of adhesives used for bonding a double-ply upper board in accordance with the present invention.

FIG. 3 is a graph for illustrating correlation between bonding forces and applied amounts of the adhesives used for bonding a double-ply upper board in accordance with the present invention, in which the bonding force is increased as the applied amount of the adhesives is increased. At this time, results of the graph was obtained by a test for bonding force (test for tensile force) which is performed using a tensile tester with two samples, each having a size of 50×200 mm$^2$ with a bonding area of 50×50 mm$^2$.

When the applied amount of adhesives 80 is 2.0 kg/pyung, it is suitable in terms of the bonding force since the bonding force is 4.0 kgf/cm² (40 ton/m² or more), but, when considering the safety factor of about 25%, the applied amount of adhesives 80 is preferably 2.5 kg/pyung or more. If the applied amount of adhesives is excessive, costs are increased in comparison to the bonding force, and thus the applied amount of adhesives is in the range of 2~10 kg/pyung, and preferably, in the amount of 2.5~5 kg/pyung.

Figure 4:
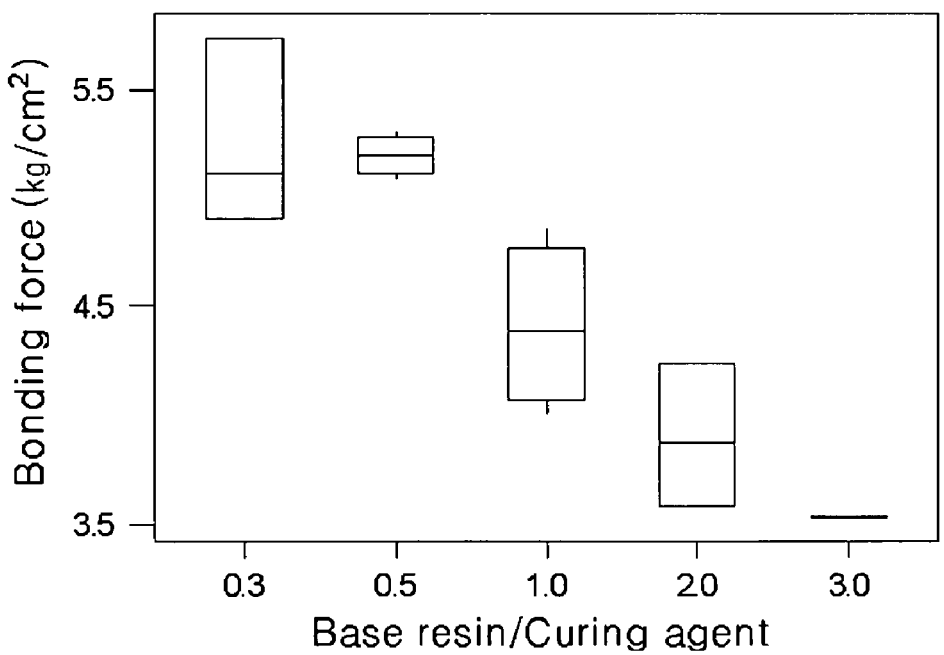
FIG. 4 is a graph for illustrating correlation between a bonding force and a mixing ratio of curing agent and base resin of the adhesives used for bonding the double-ply upper board in accordance with the present invention.

FIG. 4 is a graph for illustrating correlation between a bonding force and a mixing ratio of the curing agent and the base resin of the adhesives 80 used for bonding the double-ply upper board in accordance with the present invention. As shown in FIG. 4, it can be confirmed that, as the ratio of the curing agent in the adhesives 80 is increased, the bonding force is also increased. If the ratio of the curing agent is too low in the adhesives 80, it is difficult to obtain a desired bonding force. On the contrary, if the ratio of the curing agent is excessive in the adhesives 80, the bonding force is not remarkably increased. Thus, the mixing ratio of the base resin and the curing agent is preferably in the range of 0.3~1.5 in terms of weight ratio. However, the mixing ratio of the base resin and the curing agent is 1:1 in practical use in terms of weight ratio according to a typical standard.

Figure 5:
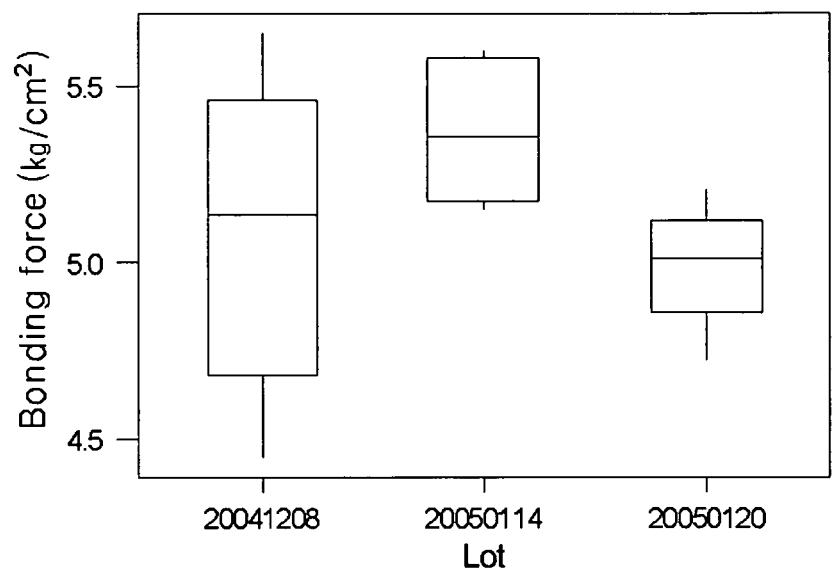
FIG. 5 is a graph for illustrating correlation between a bonding force and a lot number of the adhesives used for bonding the double-ply upper board in accordance with the present invention.

FIG. 5 is a graph for illustrating correlation between a bonding force and a lot number of the adhesives used for bonding the double-ply upper board in accordance with the present invention. As can be appreciated from FIG. 5, the bonding force is not significantly changed according to the lot number of the adhesives related to manufacture date of the adhesives, and the adhesives manufactured within three months provides a suitable the bonding force.

Figure 6:
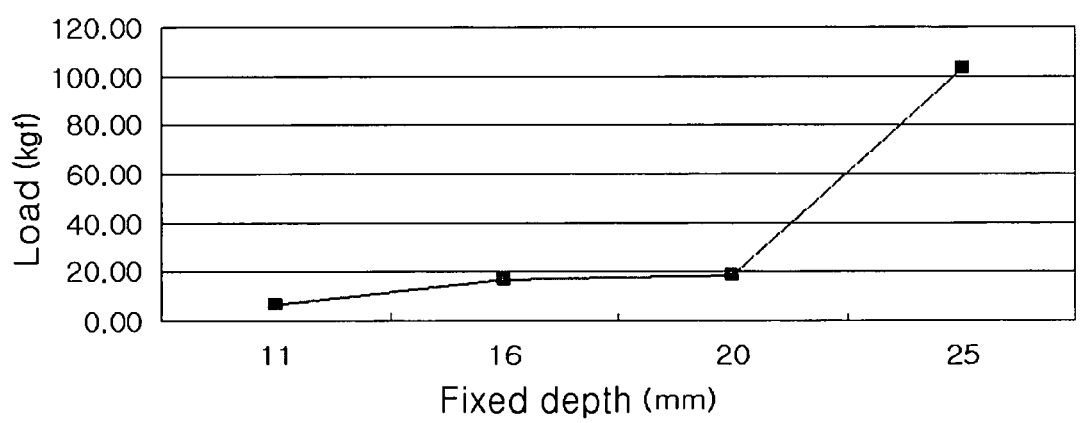
FIG. 6 is a graph for illustrating correlation between a fixing force and a fixed depth of a self drill screw used for fixing the double-ply upper board in accordance with the present invention.

FIG. 6 is a graph for illustrating correlation between a fixing force and a fixed depth of the self drill screw used for fixing the double-ply upper board in accordance with the present invention. In FIG. 6, it can be confirmed that, as the fixed depth of the self drill screw 90 in the side molding material 70 is increased, the fixing force with respect to the first upper board elements 40 is increased. If the fixed depth of the self drill screw 90 is too small, it is difficult to obtain sufficient bonding force. Accordingly, although it is different according to the length of the self drill screws 90, and the thickness of the side molding material 70, the fixed depth of each self drill screw 90 in the side molding material 70 is in the range of about 20~50 mm, and preferably 25 mm or more. Each self drill screw 90 preferably has a length of 38 mm on the flat fillister head.

The side molding material 70 preferably has a square shape, and a size of 30~50 mm. As can be appreciated from the following Table 1, when the side molding material 70 has a size of a length of 32 mm×a width of 32 mm, it is sufficient in terms of bending strength.

TABLE 1

| Size | Maximum Load (kgf) | Bending strengtn (kgf/mm²) | Average load (kgf) | Average bending strength (kgf/mm²) |
|---|---|---|---|---|
| 32 × 25 mm | 299.1 | 2.629 | 304.80 | 2.62 |
|  | 303.8 | 2.556 |  |  |
|  | 311.5 | 2.663 |  |  |
| 32 × 35 mm | 479.5 | 2.945 | 477.77 | 2.89 |
|  | 480.0 | 2.928 |  |  |
|  | 473.8 | 2.808 |  |  |
| 32 × 32 mm | — | — | 425.88 | 2.81 |

Table 2 shows test results for determining the size of a hera used for applying the adhesives. As can be seen from Table 2, when a groove of the hera has a greater width, a higher height, and a narrower pitch distance, it is advantageous all the more. Preferably, the hera has a pitch length of 17 mm or less, and is made of a steel plate in order to reduce wear of the hera.

Accordingly, when the hera is made of the steel plate, it is appropriate that the groove of the hera has a width and a height of 3~7 mm, a pitch length of 9~22 mm, and a pitch distance of 6~15 mm. In addition, when considering an applied amount of adhesives in the range of 2.5~2.8 kg/pyung for obtaining a sufficient bonding force of, for example, 4.6~4.7 Kg/cm², the hera made of the steel plate is formed to have a groove which has a width of 5 mm, height of 4 mm, a pitch length of 15 mm via modification of Case 1 shown in Table 2.

TABLE 2

| Case | Width of groove (mm) | Height of groove (mm) | Pitch distance (mm) | Pitch length (mm) | Area of groove (mm²) | Applied amount (kg) /m² | /pyung |
|---|---|---|---|---|---|---|---|
| Standard | 5 | 7 | 11 | 16 | 17.5 | 1.3 | 4.3 |
| 1 | 5 | 4 | 9 | 14 | 10.0 | 0.9 | 2.8 |
| 2 | 7 | 4 | 15 | 22 | 14.0 | 0.8 | 2.5 |
| 3 | 5 | 3 | 9 | 14 | 7.5 | 0.6 | 2.1 |
| 4 | 3 | 3 | 6 | 9 | 4.5 | 0.6 | 2.0 |
| 5 | 5 | 3 | 12 | 17 | 7.5 | 0.5 | 1.8 |

Figure 7:
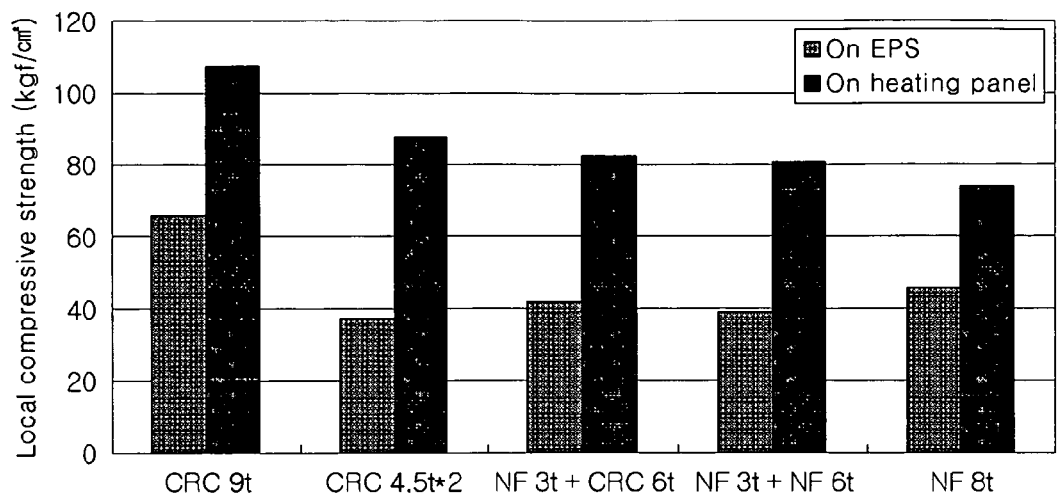
FIG. 7 is a graph for illustrating correlation between local compressive strength and combination of first and second upper board elements constituting the double-ply upper board in accordance with the present invention.

FIG. 7 is a graph for illustrating correlation between local compressive strength and combination of the first and second upper board elements 10 and 50 constituting the double-ply upper board in accordance with the present invention. In FIG. 7, left bars indicate local compressive strengths measured on the insulation material 20 formed of EPS, and right bars indicate local compressive strengths measured on the heating panel used as the heat radiator 30. In FIG. 7, "CRC" means a cellulose fiber reinforced cement board, "NF" means a magnesium board, and "t" means a thickness. For example, "9t" means a thickness of 9 mm.

Figure 8:
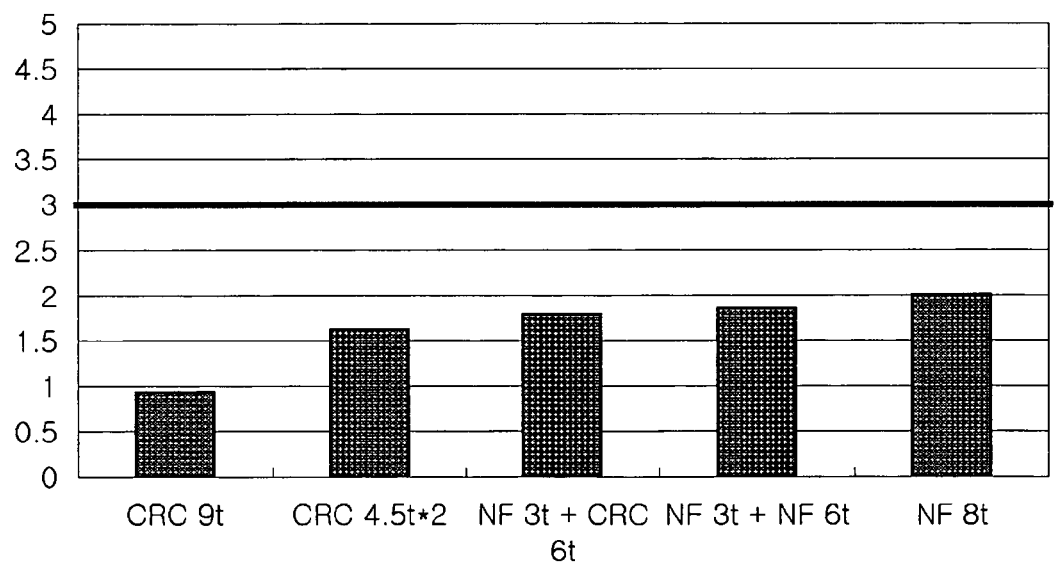
FIG. 8 is a graph for illustrating a compressed depth on the double-ply upper board of the present invention when compressing the upper board with a force of 100 kgf using a semi-spherical pressing rod (diameter of 25 mm).

FIG. 8 is a graph for illustrating a compressed depth on the double-ply upper board of the present invention when compressing the upper board with a force of 100 kgf using a semi-spherical pressing rod (diameter of 25 mm).

The total thickness of the first and second upper board elements 40 and 50 is 9 mm or more, and preferably in the range of 9~12 mm, wherein each of the first upper board elements 40 has a thickness of 6 mm, preferably in the range of 6~8 mm, and each of the second upper board elements 50 preferably has a thickness in the range of 3~6 mm.

As can be appreciated from FIG. 7, in comparison to the cases CRC 9t and NF 8t where the upper board is constituted by a single layer, the upper board constituted of double layers has a lower strength against the local load. Accordingly, when the total thickness of the first and second upper board elements 40 and 50 is 9 mm or more, the upper board can endure a force of 30 kgf/cm² or more which is required when applying the local compressive strength thereto (Test Method: KS F 2273) (see FIG. 7), and the upper board has a compressed depth of 3 mm or less when applying a load of 100 kgf thereto (see FIG. 8).

Since the first upper board elements 40 protect the heating components below the upper board, and support the load on the upper board, each of the first upper board elements must have a bending strength of 100 kgf/cm² or more. Meanwhile, since the second upper board elements 50 serve to remove steep steps at the seaming portions between the first upper board elements 40 in order to form a smooth curve on the upper board, each of the second upper board elements 40 must be flexible. In this regard, if the second upper board elements 50 have a thickness more than 6 mm, the second upper board elements 50 have a low flexibility, and thus the second upper board elements 50 preferably have a thickness of 3~6 mm.

INDUSTRIAL APPLICABILITY

According to the present invention, the upper board stacked on the heat radiator has the double-layer structure comprising the first and second upper board elements in order to prevent the steps from being formed at the seaming portions formed on the upper portion of the dry heating system, thereby maintaining the flatness of the upper board, and reducing any bending of the upper board, in which the first upper board elements constitute a lower portion of the double-layer structure, and serves to protect the heat radiator (such as a hot water pipe or a heating panel using hot water) below the upper board while supporting a weight (of commodities) loaded on the upper board, and the second upper board elements constitute an upper portion of the double-layer structure, and serve to maintain the flatness of the upper board by removing the steps, thereby ensuring excellent quality in construction of the dry heating system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A structure of a dry heating system which comprises a heat radiator and an upper board stacked on the heat radiator,
   wherein the upper board comprises a plurality of first upper board elements and a plurality of second upper board elements to constitute a double-layer structure, and the first upper board elements and the second upper board elements are stacked on the heat radiator such that seaming portions between the first upper board elements and seaming portions between the second upper board elements are alternately arranged at upper and lower portions of the upper board so as not to overlap each other;
   the structure further comprises a heat insulation material formed on a slab constituting a bottom of a building, and a side molding material provided to a side of the heat insulation material and fixed to the slab;
   the heat radiator is positioned on the heat insulation material and employs hot water as a heat source;
   the first upper board elements are stacked on the heat radiator and fixed to the side molding material;
   the second upper board elements are stacked on the first upper board elements and bonded to the first upper board elements by adhesives; and
   the side molding material has a square shape with a chamfer portion formed at one corner thereof such that a portion of the side molding material is disposed on the slab, and a gap is formed between the chamfer portion and the slab and a wall of the building,
   wherein a total thickness of the first upper board elements and the second upper board elements is in the range of 9-12 mm, each of the first upper board elements has a thickness of 6-8 mm, and each of the second upper board elements has a thickness of 3-6 mm.

2. The structure according to claim 1, wherein the first upper board elements are bonded to the second upper board elements with heat resistance epoxy-based adhesives.

3. The structure according to claim 1, wherein the adhesives are applied in an amount of 2~10 kg/pyung (3.3 m$^2$).

4. The structure according to claim 1, wherein the adhesives comprise a base resin and a curing agent mixed in the weight ratio of 0.3~1.5.

5. The structure according to claim 1, wherein the first and second upper board elements are made of at least one selected from inorganic boards, metal plates, Engineering Plastics (EP) and Wood Polymer Composites (WPC).

6. The structure according to claim 1, wherein the side molding material has a length and a width, both being in the range of 30~50 mm.

7. The structure according to claim 1, wherein the first upper board elements are fixed to the side molding material by self drill screws, and a fixed depth of each self drill screw in the side molding material is in the range of 20~50 mm.

8. The structure according to claim 1, wherein the heat radiator is a hot water pipe, a heating panel comprising the hot water pipe, or a heating panel having an internal fluid passageway formed therein.

9. A method for constructing a dry heating system, comprising the steps of:
   providing a heat insulation material on a slab constituting a bottom of a building;
   providing a side molding material to a side of the heat insulation material, followed by fixing the side molding material to the slab utilizing a concrete tacker pin;
   providing a heat radiator on the heat insulation material, the heat radiator employing hot water as a heat source;
   providing first upper board elements on the heat radiator, followed by fixing the first upper board elements to the side molding material; and
   applying adhesives to an upper surface of the first upper board elements, followed by bonding second upper board elements to the first upper board elements,
   wherein the side molding material has a square shape with a chamfer portion formed at one corner thereof such that a portion of the side molding material is disposed on the slab, and a gap is formed between the chamfer portion and the slab and a wall of the building,
   wherein the adhesives are applied to the upper surface of the first upper board elements using a hera made of a steel plate and having a groove formed thereon, the groove having a width and a height of 3-7 mm, a pitch length of 9-22 mm, and a pitch distance of 6-15 mm.

10. The structure according to claim 1, further comprising a concrete tacker pin utilized to fix the side molding material to the slab.

\* \* \* \* \*